United States Patent

Drum

[15] 3,690,336

[45] Sept. 12, 1972

[54] CONDITION RESPONSIVE VALVE

[72] Inventor: Edward W. Drum, Indianapolis, Ind.

[73] Assignee: Ransburg Electro-Coating Corp., Indianapolis, Ind.

[22] Filed: Sept. 8, 1970

[21] Appl. No.: 70,238

[52] U.S. Cl..................................137/75, 251/149.6
[51] Int. Cl...............................................F16k 17/36
[58] Field of Search................137/72, 73, 75, 76, 77; 251/149.6

[56] References Cited

UNITED STATES PATENTS

| 2,707,965 | 5/1955 | Allen | 137/75 |
| 3,245,423 | 4/1966 | Hansen et al. | 137/75 X |
| 3,085,589 | 4/1963 | Sands | 251/363 X |

FOREIGN PATENTS OR APPLICATIONS

| 838,087 | 6/1960 | Great Britain | 137/75 |

Primary Examiner—M. Cary Nelson
Assistant Examiner—Richard Gerard
Attorney—Merrill N. Johnson, Harry E. Downer, David H. Badger and Charles W. Hoffmann

[57] ABSTRACT

A condition responsive material flow control valve that reacts to the occurrence of the condition to terminate material flow through the valve. The valve is designed to activate only when the condition exists. The valve may be responsive to a condition such as exceeding a predetermined elevated temperature; the presence of such an elevated temperature causes adjacent body members to separate and a ball valve to engage with a valve seat so as to terminate the material flow through the valve. The valve has very few moving parts and is dependable.

15 Claims, 3 Drawing Figures

PATENTED SEP 12 1972 3,690,336
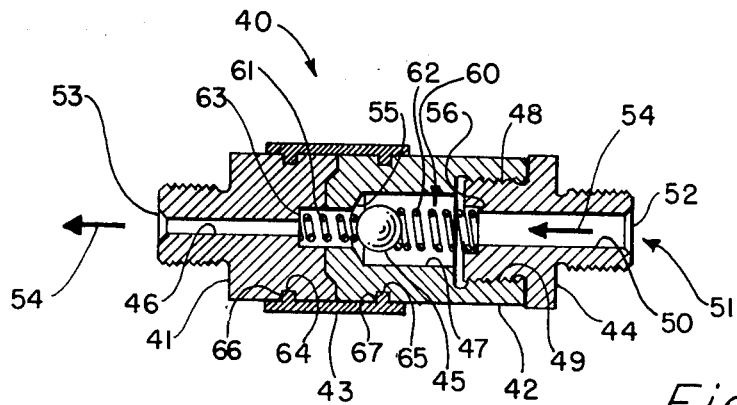
Fig. 2
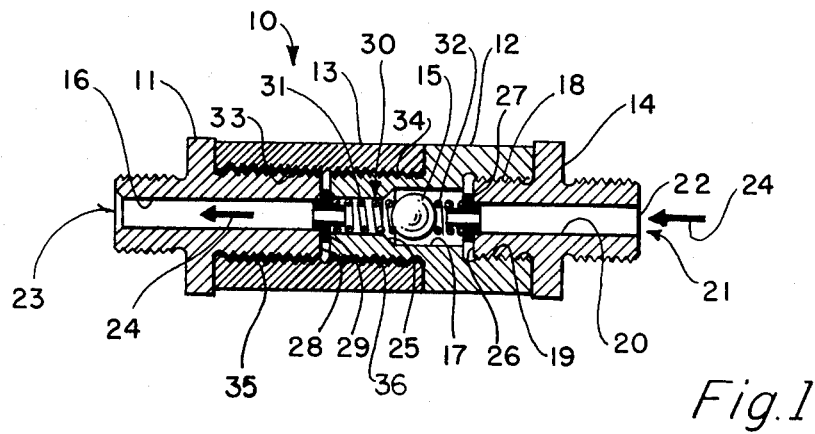
Fig. 1
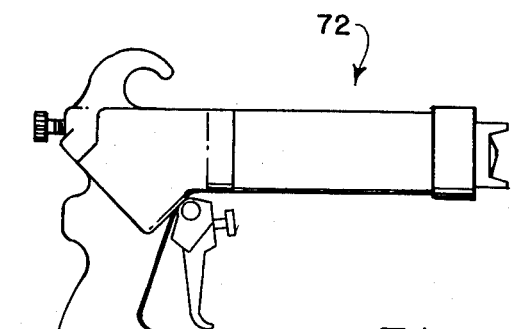
Fig. 3
INVENTOR
EDWARD W. DRUM
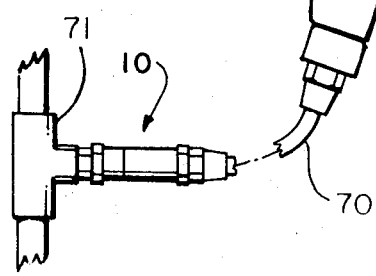

CONDITION RESPONSIVE VALVE

The present invention relates to a material flow control valve that is responsive to the occurrence of a condition to thereby terminate material flow through the valve. More particularly, the invention is directed to a valve responsive to an elevated temperature so as to terminate material flow through the valve upon occurrence of such an elevated temperature.

During the operation of a material dispensing system, combustion of a combustible material contained within the material dispensed may occur for any one of several reasons such as operator negligence, system malfunction and the like. If combustion is not quickly terminated, the hose used to convey the material to a dispensing device may suffer a failure due to the heat associated with combustion. Upon failure of the hose, material emerges from such a failure site. Combustion tends to continue since the material continues to flow to the site of the failure in the hose due to the pumping action of a pump means used to move the material from the material reservoir to the dispensing device. Therefore, it is seen that if the flow of material to the site of combustion is not terminated upon combustion or shortly thereafter, a conflagration of considerable magnitude may be experienced where only minor damage might have been experienced had the flow of material been terminated quickly.

Suggested devices to terminate the flow of materials such as paint and paint-like materials to the site of combustion generally include valves having component parts which operate or move in close relationship with one another. One such valve may include a pivotal valve member while another such valve may include sliding valve members. Each of these valves includes closely spaced, cooperative surfaces intended to coact in such a way so as to terminate the flow of material through the device. However, after the passage of time a solid consitutent or constituents in materials such as paint and paint-like coating materials tend to deposit on the closely cooperating surfaces. The deposits on such surfaces may result in a malfunction of such valves employing a pivotal valve member or a valve member having sliding surfaces.

Accordingly, it is the object of the present invention to provide a valve that does not have pivotal members or sliding surfaces and that is dependable in operation, even after extended exposure to paint and paint-like coating materials. Another object of the present invention is to provide a valve having a pair of adjacent body members and means responsive to an elevated temperature whereby the occurrence of the elevated temperature causes the adjacent body members to separate and a valve member to be displaced to a position of engagement with a valve seat. Another object of the invention is to provide a valve of low cost for industrial applications employing a plurality of paint spraying stations with the possibility of a plurality of colors at each station thereby requiring large numbers of such valves.

Generally speaking, the present invention relates to a valve having a pair of adjacent body members normally retained in contiguous or adjacent relationship and a sleeve having at least a portion thereof which is heat sensitive. Subjecting the sleeve to an elevated temperature initiates a response by the sleeve that causes the adjacent body members to separate and a movable valve member to engage with a valve seat.

It is to be understood that the concepts of the present invention are applicable to controlling the flow through a hose of materials containing a combustible constituent or a constituent which when released at an elevated temperature in the atmosphere may result in an undesirable product, by-product or result and is not necessarily limited to controlling the flow of materials such as paint or paint-like material through the hose. Paint, as the term is used herein, includes coating compositions consisting of a binder and a solvent of both a liquid and semifluid nature which change to a solid film with the passage of time.

In the drawing:

FIG. 1 is a cross sectional side view of a valve embodying the concepts of the present invention;

FIG. 2 is a cross sectional side view of another valve employing the concepts of the present invention; and FIG. 3 is a schematic of an air atomizing paint spray gun employing the valve of FIG. 1.

Referring now to FIG. 1 of the drawing, a material flow control valve embodying the concepts of the invention is indicated by the reference numeral 10. The valve 10 includes adjacent or contiguous body members 11 and 12, condition responsive means 13 adjacent the body members, nipple 14, movable valve member 15, and bias means 30. The body members 11 and 12, the valve member 15 and nipple 14 are fabricated from any suitable material such as steel or the like resistant to the chemical and abrasive properties of the material flowing therethrough and relatively insensitive to elevated temperatures.

The pair of adjacent or contiguous body members 11 and 12 may be retained in adjacent or contiguous relationship by condition responsive means 13 as shown in FIG. 1. The adjacent body members 11 and 12 include a bore 16 and a bore 17 respectively. The nipple 14 may be a double male nipple, as shown in FIG. 1, or any one of many other possible nipple configurations such as including female threads. The double male nipple 14 includes a threaded portion 18 turned into the threaded female portion 19, of the body member 12. The nipple 14 includes bore 20. The bore 16 of the body member 11, the bore 17 of the body member 12 and the bore 20 of the nipple 14 cooperate to provide material passageway 21. The passageway 21 begins at inlet port 22 of bore 20 and terminates at outlet port 23 of bore 16. Material may flow in either direction through passageway 21 during normal use; however, when the valve 10 activates, it prevents the flow or backflow of material in the direction of arrows 24.

One of more pairs of valve 10 may be serially connected so as to prevent material flow in either direction upon activation of the serially connected valves. When serially connecting valves 10, it is preferred that member 11 of one valve 10 be adjacent or abutting the member 11 of the other valve 10 or that member 11 is suitably designed so that one member 11 serves both valves.

A beveled shoulder 25 is provided in the body member 12. Preferably, the shoulder 25 is annular.

Located in bore 17 and adjacent the beveled shoulder 25 is movable valve member 15. The valve member 15 is shown in FIG. 1 as being a ball valve.

Positioned within passageway 21 and engaged with extremity 26 of nipple 14 is bias locator 27. Also positioned within passageway 21 and engaged with extremity 28 of body member 11 is bias locator 29.

Bias means 30 is located between bias locators 27 and 29 in passageway 21. The bias means 30 normally locates the ball valve 15 between the locator 27 and the beveled shoulder 25. It is seen that under normal operating conditions a material is permitted to flow around ball valve 15 and past the beveled shoulder 25. The bias means 30 may include two spiral springs 31 and 32. The spiral springs 31 and 32 may be made from any suitable resilent and wear and corrosion resistant material. Spiral spring 31 is generally located between locator 27 and ball valve 15 in passageway 21. Spiral spring 31 possesses sufficient bias strength to prevent ball valve 15 from engaging with the beveled shoulder 25 as material flows through the passageway 21.

Condition responsive means 13 may retain or assist in retaining body members 11 and 12 in adjacent or contiguous relationship under normal operating conditions. Means 13 may be a sleeve having a bore of sufficient diameter to circumscribe the threaded male portions 33 and 34 of body members 11 and 12 respectively. The sleeve 13 or a suitable portion thereof is fabricated from a thermal sensitive material. Preferably, the thermal sensitive material used in sleeve 13 has sufficient strength to retain the body members 11 and 12 in continuous relationship when subjected to the hydraulic pressure used to transport the material through the passageway 21 and has sufficient properties to withstand the elevated temperatures normally associated with industrial manufacturing installations, yet experiences a significant reduction in strength when subjected to the elevated temperatures. If the material flowing through the valve is paint or a paint-like material, thermal sensitive sleeve 13 may be fabricated from a suitable tin alloy, lead alloy, a tin-lead alloy, a tin-lead-bismuth-cadmium alloy or the like. An example of a suitable tin-lead-bismuth-cadmium alloy would be an alloy including about 42.5 weight percent bismuth, 37.7 weight percent lead, 11.3 weight percent tin, 8.5 weight percent cadmium and minor amounts of impurities having no apparent effect on the thermal properties of the alloy. This lead-tin-bismuth-cadmium alloy appears to have no definite melting point temperature but has a melting point temperature range of about 158°–190° F. The thickness of the wall of the sleeve 13 fabricated from a thermal sensitive material depends on many factors. However, a sleeve having wall thickness of about 0.15 to 0.25 inch and fabricated from the tin-lead-bismuth-cadmium alloy appears to be satisfactory when the material flowing through the valve 10 is a paint or paint-like material at pressures normally associated with transporting such materials.

Subjecting the heat sensitive sleeve 13 to an elevated temperature, such as for example that associated with ignited paint, causes the sleeve to lose structural strength such that it is no longer capable of retaining body members 11 and 12 in adjacent or contiguous relationship. The energy stored in bias means 30 is released causing body members 11 and 12 to physically separate. Upon separation of body members 11 and 12, spiral spring 31 no longer serves to retain ball valve 15 in its normal position and the energy theretofore stored in spiral spring 32 is at least released to the extent that ball valve 15 is displaced in the direction of the material flow so as to engage with beveled shoulder 25 to thereby terminate material flow through the valve 10 in the direction of arrows 24. It is thought that if spring 32 would malfunction upon separation of the body members 11 and 12, the movement of the material through the valve 10 is of such a character as to cause the ball valve 15 to engage with beveled shoulder 25. The response speed of the ball valve 15 is determined to a large extent by the amount of energy released by spring 32 and the rate of material flow through the valve 10.

A suitable thermal barrier means 35 and 36 may be positioned between body members 11 and 12 so as to minimize the conduction of heat away from sleeve 13. The use of thermal barrier means 35 and 36 may be desirable where the body members 11 and 12 are fabricated from highly thermal conductive materials. A suitable thermal barrier material for means 35 and 36 is polytetrafluoroethylene or the like. Preferably, the thermal barrier material is resilient and chemical resistant. The thermal barrier should not be of such construction as to impede separation of body members 11 and 12 when sleeve 13 responds to an elevated temperature.

FIG. 2 shows material flow control valve 40 which also embodies the concepts of the present invention. The material control valve 40 includes abutting body members 41 and 24, condition responsive means 43 which retains the body members in abutting relationship, nipple 44, and movable valve member 45.

The pair of body members 41 and 42 are retained in abutting relationship in the manner shown in FIG. 2 by the condition responsive means 43. Each of the abutting body members 41 and 42 includes bores 46 and 47 respectively. The nipple 44 may be a double male nipple as illustrated in FIG. 2 or any other suitable nipple configuration. The double male nipple 44 includes a threaded portion 48 turned into the threaded female portion 49 of the body member 42. The nipple 44 has provided therein bore 50. The bore 46 of the body member 41, the bore 47 of body member 42 and the bore 50 of the nipple 44 cooperate to provide material passageway 51. The material passageway 51 begins at inlet port 52 of bore 50 and terminates at outlet port 53 of bore 46. Material may flow in either direction through passageway 51 during normal use; however, when valve 40 activates, it prevents flow or backflow of material in the direction of arrows 54.

One or more pairs of valve 40 may be serially connected so as to prevent material flow in either direction upon activation of the valves. When serially connecting valves 40, it is preferred that member 41 of one valve 40 be adjacent or abutting the member 41 of the other valve 40 or that member 41 is suitably designed so that member 41 serves both valves.

A beveled shoulder 55 is provided in the body member 42. The valve 40 shown in FIG. 2 shows the shoulder 55 as being annular.

Located in bore 47 and adjacent the beveled shoulder 55 is movable valve member 45. The valve member 45 is shown as being a ball valve.

Positioned within passageway 51 and engaged with end 56 of the nipple 44 is bias means 60. The bias means 60 normally positions the ball valve 45 between end 56 and beveled shoulder 55. It should be seen that under normal operating conditions a material is permitted to flow around the ball valve 45 and past the beveled shoulder 55. As illustrated in FIG. 2, the bias means 60 includes two spiral springs 61 and 62. Spiral spring 61 is located between edge 63 formed on the body member 41 and ball valve 45 in the passageway 51. Spiral spring 62 is located between edge 56 and the ball valve 45 in the passageway 51. Spiral spring 61 possesses sufficient strength to prevent ball valve 45 from engaging with beveled shoulder 55 as the material is flowing through the passageway 51.

Condition responsive means 43 may serve to retain the body members 41 and 42 in abutting relationship under normal operating conditions. As illustrated in FIG. 2, means 43 is a sleeve of sufficient diameter to circumscribe the joint formed by the abutting members 41 and 42. The sleeve 43 includes a pair of inwardly extending, annular flanges or lugs 64 and 65. The lugs 64 and 65 are cast into annular grooves 66 and 67 formed in the body members 41 and 42 respectively. The sleeve 43 may be fabricated from the same material that sleeve 13 is fabricated. Sleeve 43 reacts to an elevated temperature in substantially the same manner as does sleeve 13.

As was the case with sleeve 13, subjecting the heat sensitive sleeve 43 to an elevated temperature such as that associated with ignited paint causes sleeve 43 to lose structural strength such that it is no longer able to retain body members in abutting relationship. The energy stored in bias means 60 is released causing the body members 41 and 42 to separate. Upon separation of the body members 41 and 42, spiral spring 61 no longer serves to retain ball valve 45 in its normal position and the energy stored in spiral spring 62 is at least released to the extent that ball valve 45 is displaced in the direction of the material flow so as to engage with the beveled shoulder 55 thereby terminating material flow through the valve 40. It is thought that if spring 62 suffered a malfunction, the movement of the material through valve 40 is of such character as to cause the ball valve 45 to engage with beveled shoulder 55 without the positive assistance of the release of the energy normally stored by spring 62.

FIG. 3 shows an in-line connection of the valve 10 of FIG. 1 to a suitable air atomizing paint spray gun 72. Valve 10 is connected between hose 70 and fitting 71. Spray painting gun 72 may be either a manual or automatic conventional air atomizing spray gun ro a manual or automatic electrostatic air atomizing spray gun. The spray gun 72 is connected through valve 10, to a source (not shown) of paint under pressure to be sprayed. Spray gun 72 is also connected to a suitable air source (not shown) for providing air to atomizing the paint supplied to the gun 72. An elevated temperature causes valve 10 to react in the manner described to terminate paint flow to hose 70 and thereby to spray gun 72.

It is to be understood that with an appropriate dispensing device such as a spray gun, the coating material source connected to such a device may serve as a reservoir for any one of a plurality of materials including but not limited to fluids including paint, paint-like material, liquids used to react to provide plastic materials and other fluids which contain a combustible constituent or constituent which when released in the atmosphere at or as a result of elevated temperatures may result in an undesirable effect, by-product or derivative.

While the invention is illustrated and described with several embodiments, it is to be understood that modifications and variations may be effected without departure from the scope and novel concept of this invention as set forth in the appended claims.

I claim:

1. A valve comprising a pair of adjacent relatively displaceable body members, each of the body members having a bore, the bores of the body members cooperating to provide a passageway for material flow, a valve seat formed in the passageway, a movable valve member in the passageway and adjacent the valve seat, bias means in the passageway including means cooperating with the movable valve member to bias the movable valve member away from the valve seat, and a temperature responsive sleeve means supporting the body members in adjacent relationship, the sleeve means responsive to a change in the temperature to release the adjacent body members, and means causing the movable valve member to engage with the valve seat means upon release of the adjacent body members by the sleeve means.

2. The valve of claim 1, including a thermal barrier between the sleeve means and the body members.

3. The valve of claim 1, wherein the bias means is a spring bias means.

4. A valve comprising adjacent relatively displaceable body members, each of the body members having a bore, the bores of the body members cooperating to provide a passageway, a valve seat formed in the passageway, a movable valve member in the passageway, means cooperating with the movable valve member to bias the movable valve member away from engagement with the valve seat, thermal responsive sleeve means for retaining the body members in adjacent relationship, the sleeve means responsive to a thermal change to release the adjacent body members, and means for displacing the movable valve member into engagement with the valve seat upon release of the body members by the sleeve means.

5. The valve of claim 4, wherein the sleeve means substantially circumscribes the joint between the adjacent body members.

6. A valve including relatively displaceable adjacent body members, a passageway in the body members, a valve seat in the passageway, a movable valve member cooperatively associated with the passageway, the movable valve member normally disengaged with the valve seat, thermal responsive sleeve means contiguous the adjacent portions of the body members for supporting the body members in adjacent relationship, the sleeve means responsive to a thermal change to release the adjacent body members, and means for displacing the movable valve member into engagement with the valve seat upon release of the body members by the sleeve means.

7. The valve of claim 6, wherein the sleeve means circumscribes the adjacent portions of the body members.

8. The valve of claim 7, wherein each body member includes a groove and the sleeve includes a lug in the groove of each of the body members.

9. A valve including relatively displaceable adjacent body members, a passageway provided by the adjacent body members, a valve seat in the passageway, a movable valve member in the passageway, the movable valve member normally disengaged from the valve seat, a sleeve substantially circumscribing the adjacent portions of the body members and retaining the body members in adjacent relationship, the sleeve responsive to an elevated temperature to release the adjacent body members, and means for displacing the movable valve member into engagement with the valve seat upon release of the adjacent body members by the sleeve.

10. The valve of claim 9, including thermal barrier means between the sleeve and the body members.

11. A valve including relatively displaceable adjacent body members, a passageway provided by the adjacent body members, valve seat means in the passageway, valve member means in the passageway and normally disengaged from the valve seat means, a sleeve supporting the body members in adjacent relationship, the sleeve being responsive to an occurrence of a predetermined condition to release the adjacent body members, and means for causing the valve member means to engage with the valve seat means upon release of the adjacent body members by the sleeve.

12. The valve of claim 11, wherein the sleeve is responsive to an elevated temperature to release the adjacent body members.

13. The valve of claim 12, wherein the sleeve circumscribes the adjacent portion of the body members and the means for causing the valve member means to engage with the valve seat is a bias means.

14. The valve of claim 13, including thermal barrier means between the sleeve and the body members.

15. The valve of claim 14, wherein the means for causing the valve member means to engage with the valve seat means includes spring means.

* * * * *